(12) United States Patent
Guliker

(10) Patent No.: US 8,844,541 B2
(45) Date of Patent: Sep. 30, 2014

(54) METHOD FOR ATTACHING HAIR EXTENSIONS; APPLICATION CLAMP, PINCH APPLICATOR, AND HAIR EXTENSION ASSEMBLY FOR USE WITH THE METHOD

(75) Inventor: Richard Guliker, JB Rotterdam (NL)

(73) Assignee: Euro Hair R&D B.V., Schipluiden (NL)

( * ) Notice: Subject to any disclaimer, the term of this patent is extended or adjusted under 35 U.S.C. 154(b) by 310 days.

(21) Appl. No.: 12/935,571

(22) PCT Filed: Apr. 10, 2009

(86) PCT No.: PCT/NL2009/000093
§ 371 (c)(1),
(2), (4) Date: Dec. 20, 2010

(87) PCT Pub. No.: WO2009/126027
PCT Pub. Date: Oct. 15, 2009

(65) Prior Publication Data
US 2011/0146698 A1    Jun. 23, 2011

(30) Foreign Application Priority Data

Apr. 11, 2008  (NL) ..................................... 1035280
Sep. 5, 2008   (NL) ..................................... 1035898

(51) Int. Cl.
| | | |
|---|---|---|
| B29C 65/00 | (2006.01) | |
| B29C 65/18 | (2006.01) | |
| B29C 65/78 | (2006.01) | |
| B29C 65/02 | (2006.01) | |
| A41G 5/00 | (2006.01) | |
| B29L 31/00 | (2006.01) | |

(52) U.S. Cl.
CPC .............. *A41G 5/008* (2013.01); *B29C 66/861* (2013.01); *B29C 65/18* (2013.01); *B29C 66/21* (2013.01); *B29C 65/7841* (2013.01); *B29C 66/0044* (2013.01); *B29L 2031/7532* (2013.01); *B29C 66/843* (2013.01); *B29C 65/02* (2013.01); *B29C 66/69* (2013.01); *A41G 5/0086* (2013.01)
USPC .............................................. 132/53; 132/201

(58) Field of Classification Search
USPC ............................................ 132/201, 53–56
See application file for complete search history.

(56) References Cited

U.S. PATENT DOCUMENTS 2,818,869 A * 1/1958 Rose ............................. 132/224
3,162,203 A * 12/1964 Cramer ......................... 132/201

(Continued)

FOREIGN PATENT DOCUMENTS

| EP | 1 699 311 A | 9/2006 |
| NL | 1 030 766 | 6/2007 |

(Continued)

OTHER PUBLICATIONS

International Search Report for Application No. PCT/NL2009/000093 dated Aug. 5, 2009.

*Primary Examiner* — Robyn Doan
(74) *Attorney, Agent, or Firm* — Knobbe, Martens, Olson & Bear, LLP

(57) ABSTRACT

The invention relates to a method for attaching hair extensions into basic hair comprising the following steps: providing a carrier foil with a number of hair extensions into the lower arm having lower recesses of an application clamp, closing the application clamp by clamping together the—hingingly interconnected—upper arm and lower arm heating the connection elements by pressing heating projections of an pinch applicator in and through the upper openings of the application clamp onto the connection elements of the hair extensions.

30 Claims, 15 Drawing Sheets

(56) References Cited

U.S. PATENT DOCUMENTS

| | | | |
|---|---|---|---|
| 7,168,432 B1* | 1/2007 | Brumfield | 132/53 |
| 7,600,520 B2* | 10/2009 | Choi | 132/224 |
| 7,946,297 B1* | 5/2011 | Fernandez | 132/201 |
| 2002/0185146 A1* | 12/2002 | Gold | 132/201 |
| 2005/0092341 A1* | 5/2005 | Padilla | 132/201 |

FOREIGN PATENT DOCUMENTS

| | | |
|---|---|---|
| WO | WO 2005/060776 A2 | 7/2005 |
| WO | WO 2005060776 A2 * | 7/2005 |

* cited by examiner

METHOD FOR ATTACHING HAIR EXTENSIONS; APPLICATION CLAMP, PINCH APPLICATOR, AND HAIR EXTENSION ASSEMBLY FOR USE WITH THE METHOD

This application is the U.S. National Phase of International Application No. PCT/NL2009/000093, filed Apr. 10, 2009, designating the U.S. and published in English as WO 2009/126027 on Oct. 15, 2009 which claims the benefit of Dutch Patent Application Nos. 1035280 filed Apr. 11, 2008 and 1035898 filed Sep. 5, 2008.

The invention relates to a method for attaching hair extensions into basic hair comprising the following steps:

providing a carrier foil with a number of hair extensions whereby the hair extensions are fixed onto the carrier foil by means of connection elements, positioning of the carrier foil with hair extensions into the lower arm having lower recesses of an application clamp such that the connection elements are positioned at the location of the lower recesses, securing the application clamp into the basic hair and subsequently arranging bunches of basic hair over the hair extensions, closing the application clamp by clamping together the—hingingly interconnected—upper arm and lower arm in such a way that the upper recesses are positioned upon the connection elements.

Such a method is known for example from European patent 1699311. In this known method hair extensions with connection elements are provided on an adhesive tape. In a separator device or an application clamp firstly a first tape with hair extensions is mounted upon a lower arm, secondly bunches or locks of basic hair of are positioned upon the hair extensions, subsequently a second tape with hair extensions is adhered with its adhesive side onto the bunches of basic hair and onto the first tape. Next the clamp is removed and then heat is applied by means of a pincher so that the hair extensions are attached onto the bunches of basic hair by melting and solidifying the portions of connection elements. This known method has a number of disadvantages.

The removal of both adhesive tapes from the basic hair and from the hair extensions is troublesome and unpleasant caused by the basic hairs sticking onto the adhesive tape. Furthermore the attachment and heating of the connection elements by applying pressure is difficult, so that an expensive, pneumatically driven, pincher is needed. The removal of the clamp and the subsequent positioning of the pincher is time consuming, complicated and unpleasant for a person because a heating jaw needs to be positioned between the tapes and the scalp.

The object of the invention is to provide a method by which easily and at low cost, preferably by using a manually operated pinchers, hair extensions may be attached into the basic hair; whereby at the same time it is not necessary to remove the clamp and furthermore the heating may be carried out in the clamp with a pinchers whereby positioning of a heating jaw between the tapes and the scalp is not required.

Therefore the method according to the invention for attaching hair extensions into basic hairs comprises the following steps:

coupling a pinch applicator onto the application clamp, heating the connection elements by moving the heating projections of the pinch applicator into the upper openings of the application clamp and pressing the heating projections onto the connection elements, disconnecting the pinch applicator, removing the application clamp from the basic hair by opening the upper arm of the application clamp and removing the carrier foil from the lower arm.

By providing the upper arm of the application clamp with openings, so that the heating projections of the pinch application may be guided through and be brought in contact with the connection elements of the hair extensions, it is not necessary to remove the clamp and to position the pinchers onto the foil, which is sticking in the basic hair. Moreover a non-adhesive carrier foil may be used as a result of which removal from the basic hair is simplified and less unpleasant for the person involved.

Preferably the method comprises the step: removing the hair extensions from the carrier foil by pulling off the connection elements from carrier foil. With this step the connection elements may be comfortably removed from the carrier foil without the necessity of having to pull off the carrier foil sticking to the basic hair.

A preferred embodiment is characterized in that the inner side of the upper arm of the applicator clamp is provided with a cover foil of flexible material. Preferably the cover foil is made of rubber; more particularly made of silicone rubber. Applying this cover foil results in a strong improvement of the formation of a regularly molten and shaped connection element, so that the hair extensions are attached more strongly with the basic hair while at the same time obtaining a more regularly shaped connection element. Silicone rubber is heat resistant and adheres not or hardly with the molten connection elements.

The invention also relates to an application clamp for attaching hair extensions into basic hair comprising a lower arm for receiving a carrier foil with hair extensions, the hair extensions being connected to the carrier foil by means of connection elements; an upper arm; a clamp hinge hingingly interconnecting the lower arm and the upper arm and; clamping means for clamping together both arms whereby the upper arm is provided with lower recesses for receiving the connection elements of the hair extensions.

Thereby the connection elements cannot flow out during heating so that strong, regularly shaped, connection elements are formed between the hair extensions and the basic hair.

Preferably the lower arm is provided with upper comb elements and lower comb elements, which upper and lower elements are essentially oppositely arranged, so that bunches of basic hair are positioned between the comb elements onto the hair extensions.

Therefore the bunches of basic hair (over the width of a hair lock) are evenly distributed over de connection elements such that an improved and more regular flowing out of the connection elements is obtained around and over the bunches of basic hair in order that strong, durable, connection elements are obtained between the basic hair and the hair extension.

In particular the upper arm is provided with upper openings. Preferably in closed position the upper openings and the lower recesses closely fit to constitute melting chambers. Particularly the lower recesses and/or the upper openings on their inside are provided with raised edges.

By carrying out the melting of the connection elements in melting chambers flowing out along the hairs is prevented and strong and regularly shaped melted together connection elements are obtained between the hair extensions and the bunches of basic hair.

In an advantageous embodiment the upper arm and the lower arm have an arcuate shape or a concave shape.

Thereby a regular pressure distribution over all of the openings and recesses is obtained so that all the hair extensions are uniformly melted together and strong connection elements of equal shape are formed.

Preferably the lower arm longitudinally is provided with a support element, particularly of metal, the support element preferably comprising the second handle hinge and/or the clamp hinge.

Thereby a good shape retaining property is obtained for the application clamp, when it is clampingly closed. When the lower arm and the upper arm are made of plastic, deformation may occur in the arcuately shaped arms so that a difference in clamping force will occur with respect to the different melting chambers and hair extensions which may give rise to irregular, unevenly, melted connections.

A preferred embodiments is characterized by the upper arm on its inside being provided with a cover foil of flexible material. In particular the cover foil is made of rubber; more particularly made of silicone rubber. Preferably the cover foil is provided with recesses—or foil portions having a reduced thickness—at the position of the upper openings of the upper arm.

By applying this cover foil formation of a regularly melted and solidified connection element is strongly improved, as a result of which the hair extensions are more firmly secured into the basic hair and a regularly shaped element is obtained.

Silicone rubber is heat resistant and does not or only slightly adhere to molten connection elements.

In an advantageous embodiment the clamping means with interlocking is provided for clamping together the lower arm and the upper arm. Particularly the clamping means comprise: an eccentric handle; an handle arm, connected to the eccentric handle by means of a first handle hinge; a second handle hinge for connecting the handle arm with the lower arm. With these means the application clamp may be closed simply and easily and furthermore sufficient pressure may be exerted onto the bunches of basic hair and hair extensions located between the lower arm and the upper arm.

The invention also relates to a pinch applicator for attaching hair extensions into basic hair, comprising: a housing; an actuating arm; a mechanism, connected with the actuating arm, for sliding out the heating jaw; a heating jaw, characterized in that the heating jaw is provided with heating projections corresponding to the upper openings of the application clamp.

By using a pincher provided with these measures the hair extensions are easily attached into the basic hair utilizing the application clamp.

In an advantageous embodiment coupling means are provided which are arranged to cooperate with the coupling means of the application clamp to allow for coupling the pinch applicator and the clamp. Thereby the pincher and the application clamp remain correctly positioned with respect to each other, before, during and after the heating step.

Moreover the invention relates to an hair extension assembly for attaching hair extensions into basic hair, comprising: a carrier foil; hair extensions consisting of bundles hair; connection elements fixing the hair extensions onto the carrier foil and which also, after attachment in the basic hair, connect the hair extensions to the basic hair.

Particularly the connection elements are portions of hot melt adhesive.

By releasable fixing the hair extensions onto the carrier foil by means of connection elements, the hair extensions may be attached into the basic hair without the use of adhesive layers so that after the attachment the connection elements are easily removed from the carrier foil.

The invention is further explained by means of a drawing of an embodiment.

Figure 1:
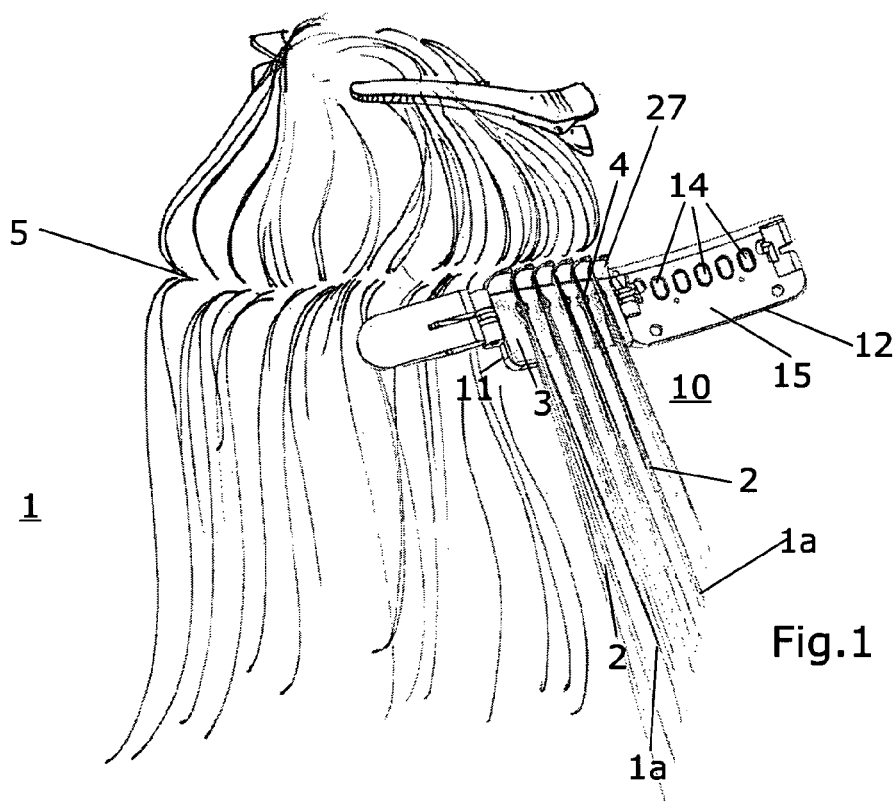
FIG. 1 shows the occiput (back of the head) of a person having attached into the basic hair the application clamp and the carrier foil assembly according to the invention.

In FIG. 1 is shown how hair extensions 2 according to the invention are attached into basic hair 1 of the hairdo of a person, so that the hair extensions 2 and the basic hair supplement each other and provide for a headdress with more volume. The hair extensions 2 are fixed onto a carrier foil 3 by means of connection elements 4. This carrier foil assembly is positioned into the lower arm 11 of application clamp 10. The application clamp 10 is attached nearby hair part(ing) 5. Bunches basic hair 1a are guided through between comb elements 27 and positioned onto hair extensions 2 and the connection elements 4.

Figure 2:
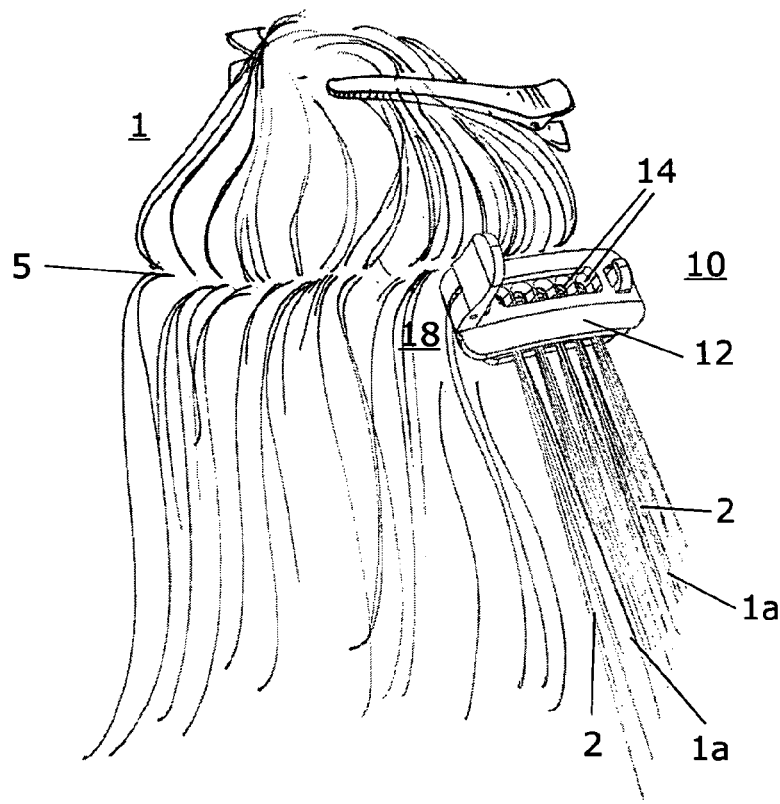
FIG. 2 shows the application foil of FIG. 1 in closed position in the basic hair.

In FIG. 2 is shown how in a subsequent step the application clamp 10 is closed and by using the clamp means 18 the upper arm 12 is clampingly connected with the lower arm 11. Through the upper openings 14 the connection elements 4 are visible and reachable for heating in order to melt them.

Figure 3:
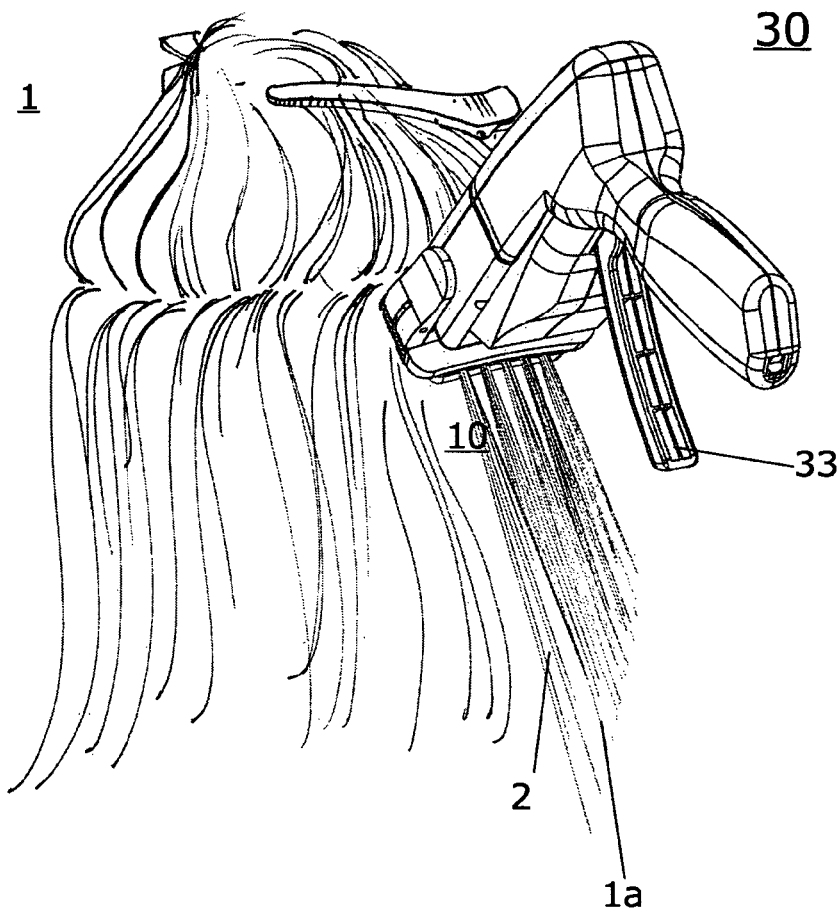
FIG. 3 show the coupling of the pinch applicator onto the application clamp.

In FIG. 3 is shown how pinch applicator 30 is coupled with application clamp 10 so that by using the actuating arm 33 the heating jaw 35 with heating projections 32 (both not shown) may be pressed against the connection elements 4 such that the connection elements 4 will melt and the hair extensions 2 are attached to the bunches basic hair 1a.

Figure 4:
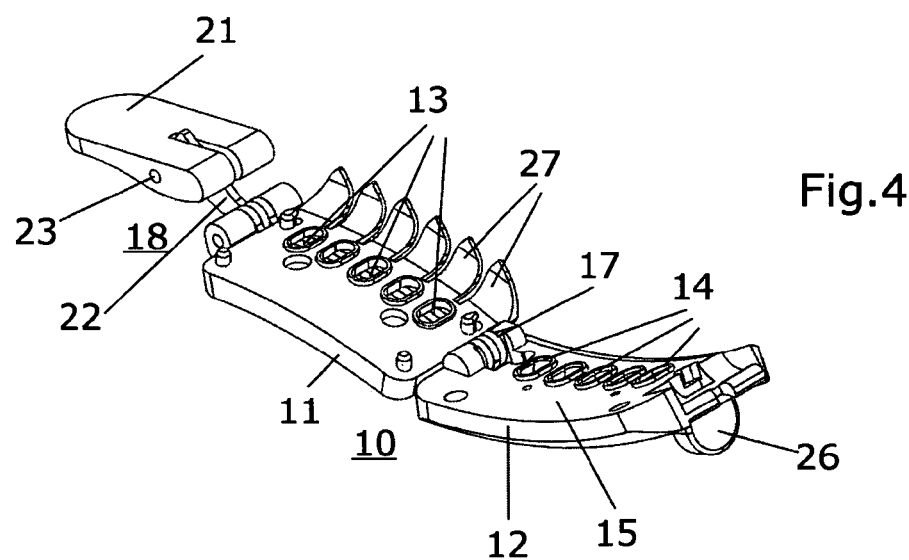
FIG. 4 shows in detail a perspective view of the application clamp according to the invention.

In FIG. 4 is shown in more detail a preferred embodiment of the application clamp 10 according to the invention comprising a lower arm 11, an upper arm 12 and a clamp hinge 17 provided between both arms. The application clamp 10 is furthermore provided with comb elements 27 and with clamp means 18 for fixedly clamping together both arms 11, 12 onto each other. In the lower arm 11 lower recesses 13 are provided and in upper arm 12 upper openings 14 are provided. In closed position of the application clamp 10 the lower recesses 13 and the upper openings 14 are oppositely arranged, so that melting chambers are formed between the carrier foil and the cover foil.

Figure 5:
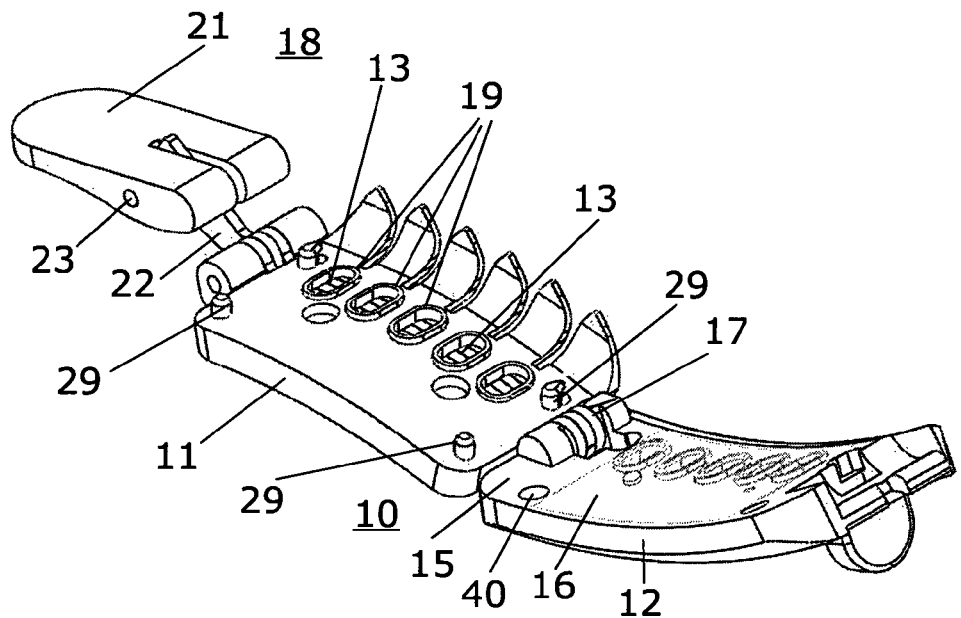
FIG. 5 shows in perspective view the application clamp of FIG. 4 provided with a cover foil.

In FIG. 5 an alternative embodiment of the application clamp 10 is shown having a cover foil 16 mounted to the inside 15 of upper arm 12. By means of the foil 16 improved connections 4 are obtained between the hair extensions 2 and the bunches of basic hair 1a; the connections having a more regular shape after melting. Raised edges 19 are provided around the lower recesses 13, where between the carrier foil 3, and optionally the cover foil 16, may be pinched off.

Figure 6:
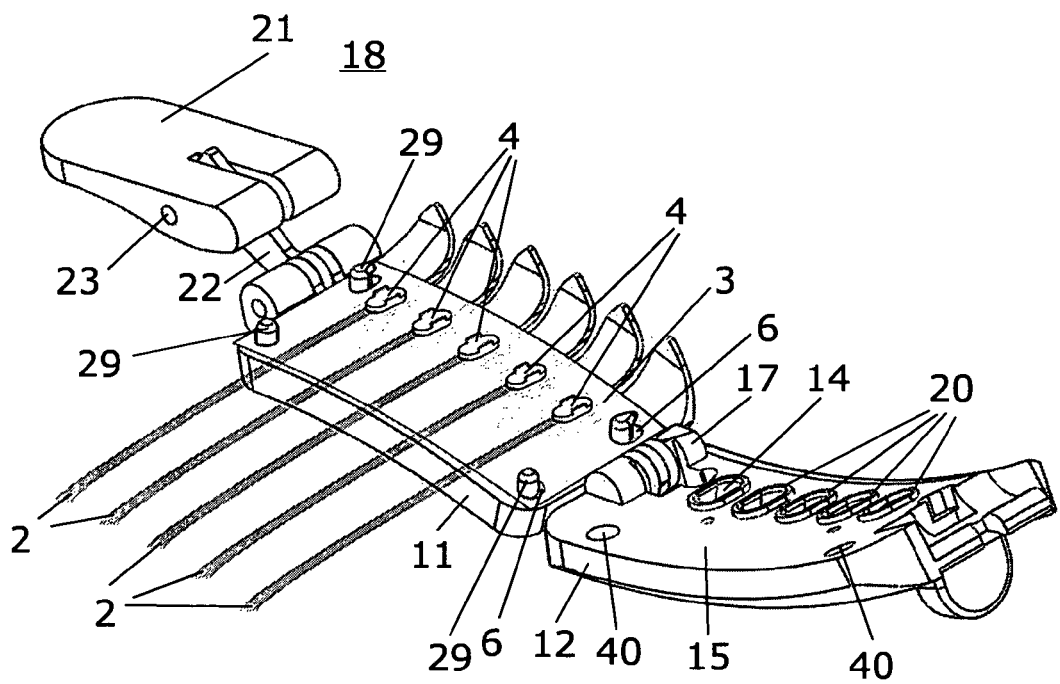
FIG. 6 shows in perspective view the application clamp of FIG. 4 provided with a carrier foil assembly with hair extensions and connection elements.

In FIG. 6 is shown how a carrier foil assembly (or hair extension assembly) consisting of a carrier foil 3, some hair extensions 2 and connection elements 4, is mounted into lower arm 11. If desired positioning projections 29 and therewith corresponding carrier foil openings 6 may be used for correct positioning. Thereby is accomplished that the connection elements 4 are correctly positioned exactly above the lower recesses 13. In order to obtain a good fixation of the carrier foil assembly into the application clamp 10 the upper arm 12 may be provided with projection recesses 40.

Figure 7A:
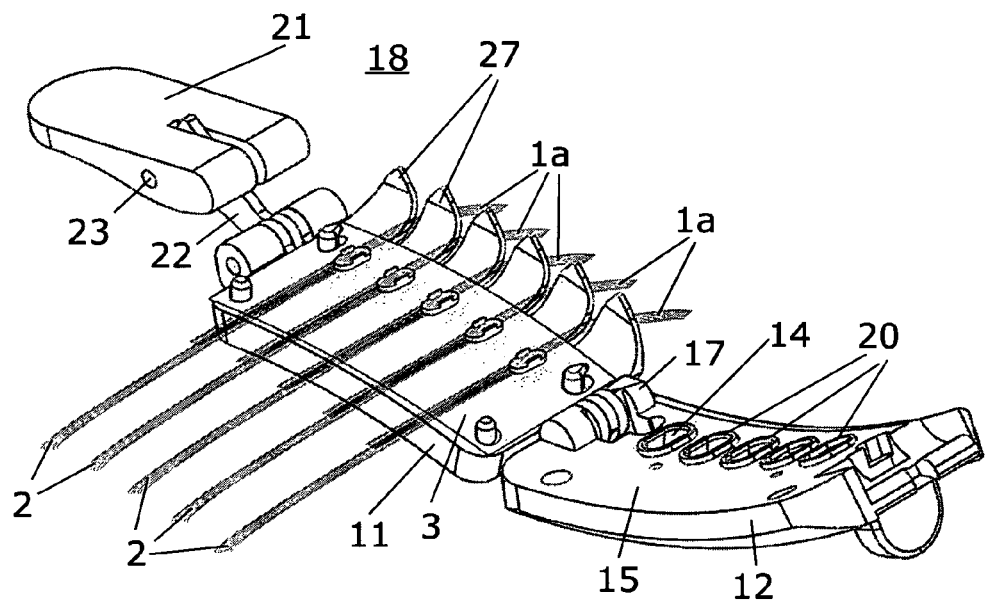
FIG. 7A shows in perspective view the application clamp of FIG. 6 provided with bunches of basic hair.

In FIG. 7A is shown how in a next step bunches of basic hair 1a are positioned between the comb elements 27 so that these bunches 1a are precisely located upon the hair extensions 2 and the connection elements 4. By closing the upper arm 12 the upper openings 14 will be exactly positioned upon the connection elements 4. The clamping means 18, capable of fixedly clamping together the upper arm 11 and the lower arm 12, comprise in this embodiment an eccentric handle 21; a first handle hinge 23, an handle arm 22, a second handle hinge 24. By positioning the eccentric handle 21 upon the upper side of the upper arm 12 and tilting said handle in the direction of the upper arm 12, a large clamping force is exerted upon both arms 11, 12 in cooperation with clamp hinge 17.

Figure 7B:
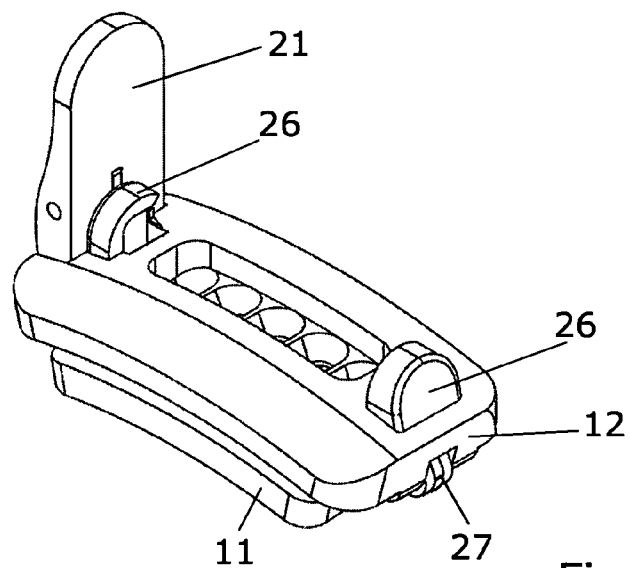
FIG. 7B shows a perspective view of the application clamp in closed position.

In FIG. 7B is shown the application clamp 10 in closed position with a vertical, perpendicularly, positioned eccentric handle 21. On the upper side of the upper arm 12 coupling means 26 are visible for coupling with the pinch applicator 30.

Figure 8A:
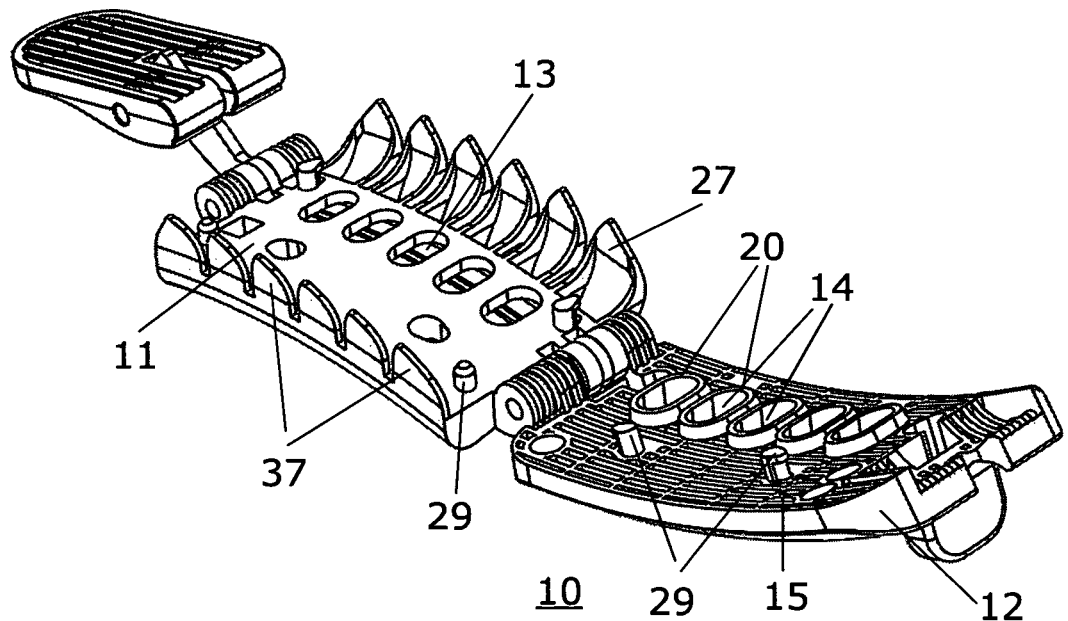
FIG. 8A shows an alternative embodiment of the application clamp having two rows of comb elements.

In FIG. 8A a third embodiment of the application clamp 10 is shown with upper comb elements 27 and lower comb elements 37 on lower arm 11. Preferably an equal number of comb elements 27, 37 is configured, which are oppositely mounted, so that continuous gutters of orientation paths are configured wherein bunches of basic hair 1a (see FIGS. 1 and 7) and hair extensions may be positioned on top of each other.

Figure 10A:
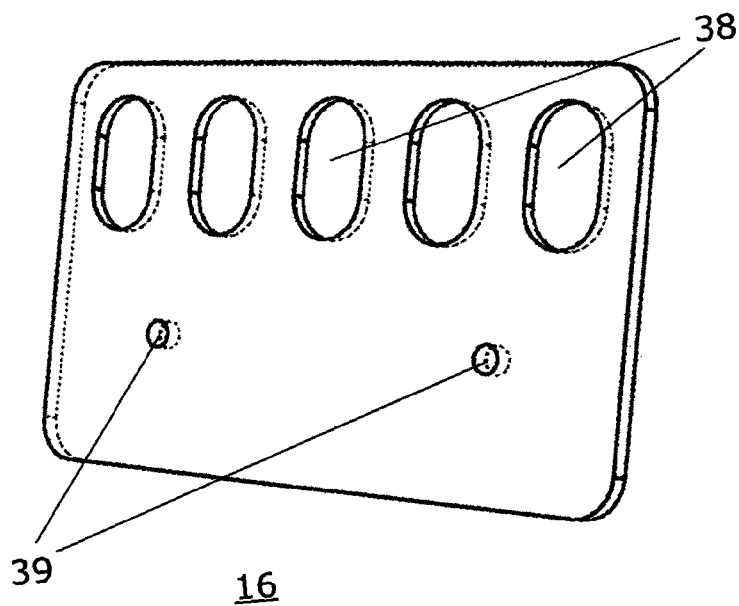
FIG. 10A shows in front view an embodiment of the cover foil.
Figure 10B:
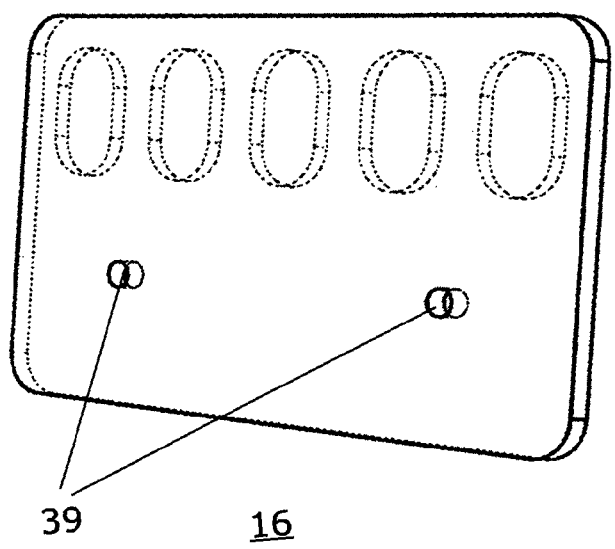
FIG. 10B shows in rearward view the cover foil of FIG. 10A.

The V-shaped recesses between the comb elements 27, 37 ensure that the bunches basic hair 1a and the hair extensions 2 will not mutually shift or displace before, and also during the closing of the application clamp 10. Moreover the use of upper and lower comb elements 27, 37 prevents separation or displacing of the hairs of the bunch of hair 1a, which is disadvantageous for the formation of a regularly shaped molten connection 4. The lower recesses 13 are in this embodiment not provided with raised edges like in FIG. 5. The upper arm 12 may also be provided with positioning projections 29 for positioning and retaining a cover foil 16 as shown in FIGS. 10A and 10B.

Figure 8B:
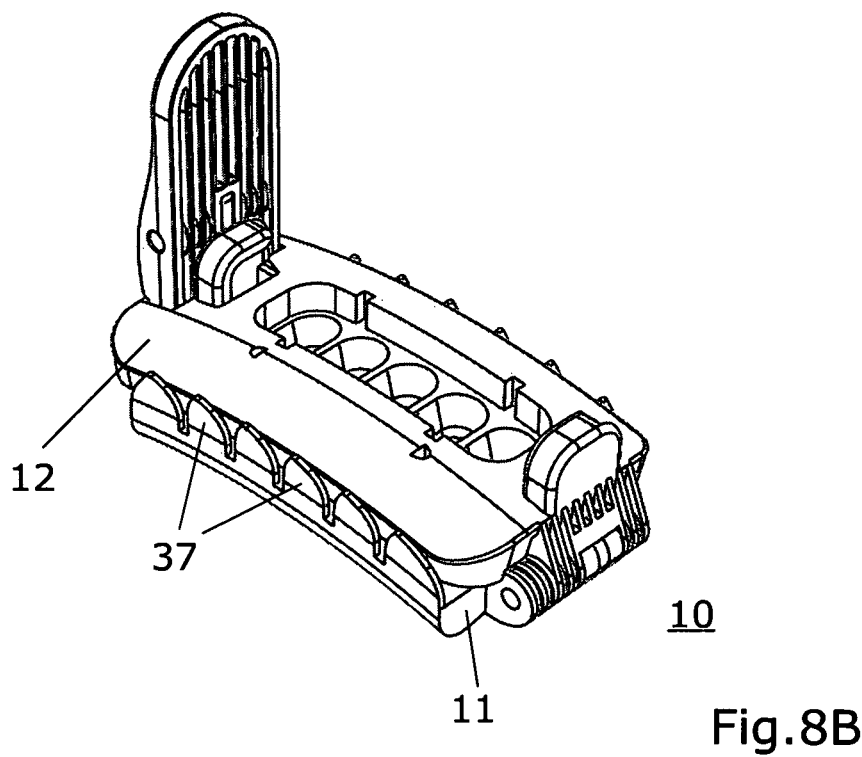
FIG. 8B shows in side view the application clamp of FIG. 8A in closed clamping position.

In FIG. 8B an embodiment of FIG. 8A in closed position is shown, whereby the lower comb elements 37 on the lower arm 11 are still visible against upper arm 12.

Figure 9A:
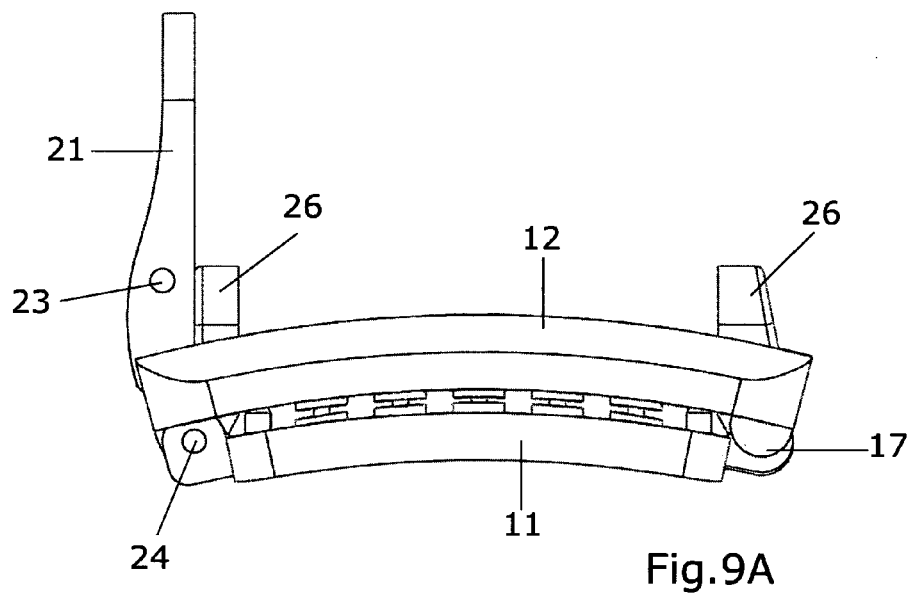
FIG. 9A shows in side view the application clamp in closed clamping position.

In FIG. 9A in side view is shown the closed application clamp 10 with first and second handle hinge 23 and 24 respectively. Furthermore the lightly curved or concave shape of the lower arm and the upper arm 12 is shown, whereby an uniform pressure distribution is obtained over all the openings and recesses and hair extensions 2.

Figure 9B:
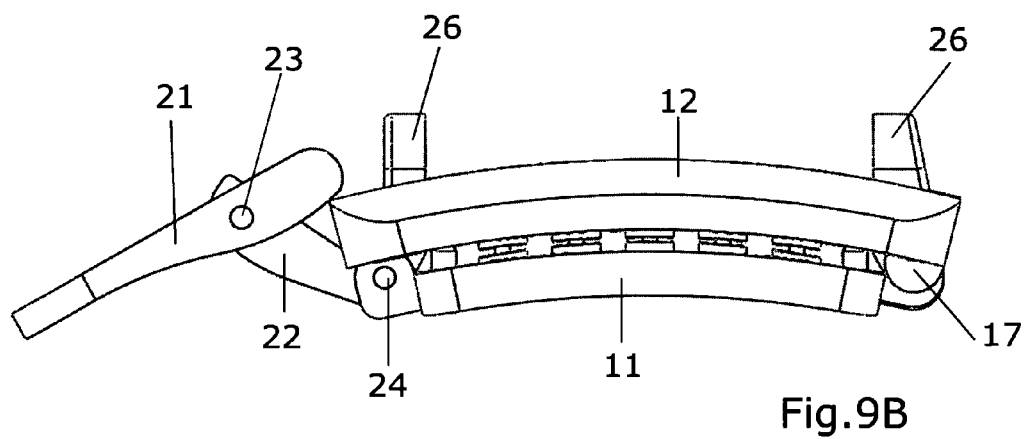
FIG. 9B shows in side view the application clamp of FIG. 9A in closed position having opened clamping means.

In FIG. 9B is shown in side view the application clamp 10 having opened clamping means 18. Visible is the clamp arm 22, which extents between the first handle hinge 23 upon the eccentric handle 21 and the second handle hinge 24 in the lower arm 12.

In FIG. 10A is shown a preferred embodiment of the cover foil 16 suitable to be used in the application clamp 10 of FIGS. 8A and 8B. In FIG. 10B the rearward side is shown as visible in FIG. 5. The front side, as shown in FIG. 10A in the use position of the application clamp, abuts against the inner side 15 of upper arm 12 (FIG. 8A). The recesses 38 are located just inside the raised edges 20 of the upper openings 14 in upper arm 12. The cover foil 16 may be exactly and fixedly positioned upon the positioning projections 29 on upper arm 12 by means of positioning openings 39 (see FIG. 8A). At the spot of recesses 38 the thickness of the cover foil is reduced as a result of which the heat conduction from the heating projections 32 through the cover foil is improved (see FIG. 16A-16B).

Figure 11A:
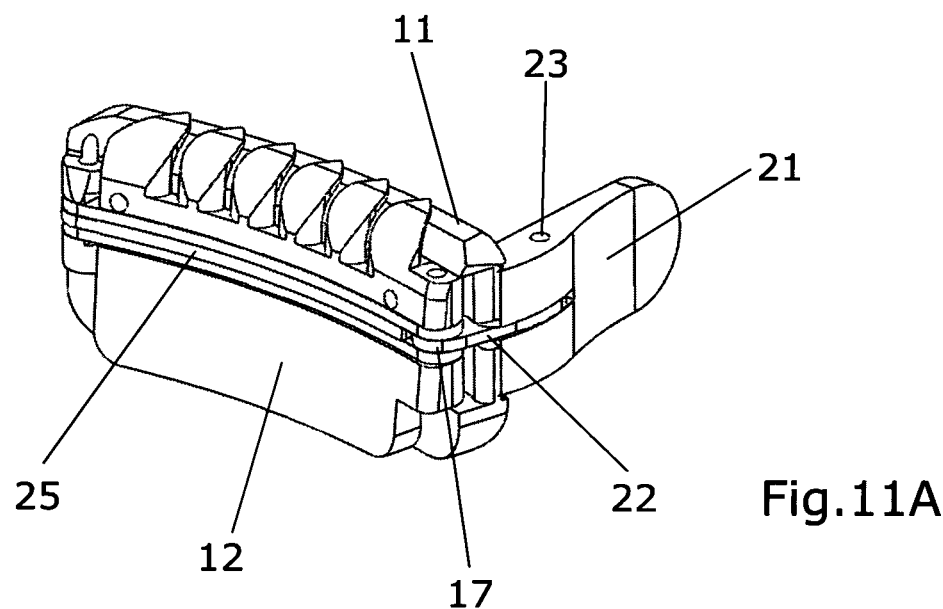
FIG. 11A shows in perspective bottom view the application clamp with support element.

In FIG. 11A in a bottom view is shown a advantageous embodiment of the application clamp 10, whereby on the bottom side of the lower arm 12 a support element 25 is provided. Preferably this support element 25 is made of metal and is extending onto the clamp hinge 17, the second and first handle hinge 24 and 23 respectively. Thereby an improved shape retaining property of the application clamp 10 is obtained when it is clampingly closed. In case the lower arm 11 and the upper arm 12 are made of plastic it was observed that deformation may occur in the arcuate arms so that a difference in clamping force will be exerted upon the different melting chambers and hair extensions 2 which may lead to irregular, non uniform melted connections. The plastic parts are preferably made of an reinforced plastic like a fibreglass reinforced plastic in order to increase its shape retaining properties.

Figure 11B:
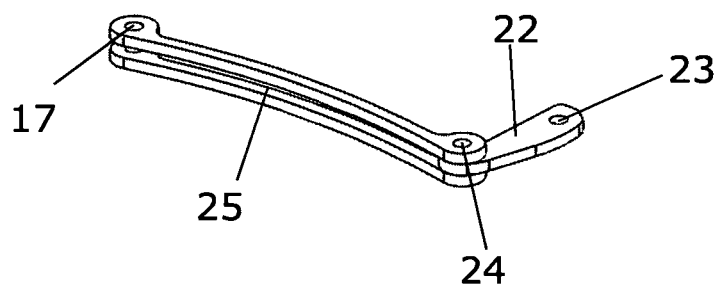
FIG. 11B shows the support element of FIG. 11A.

In FIG. 11B the support element 25 is shown in detail with a handle arm 22 connected by means of a handle hinge 24.

Figure 12:
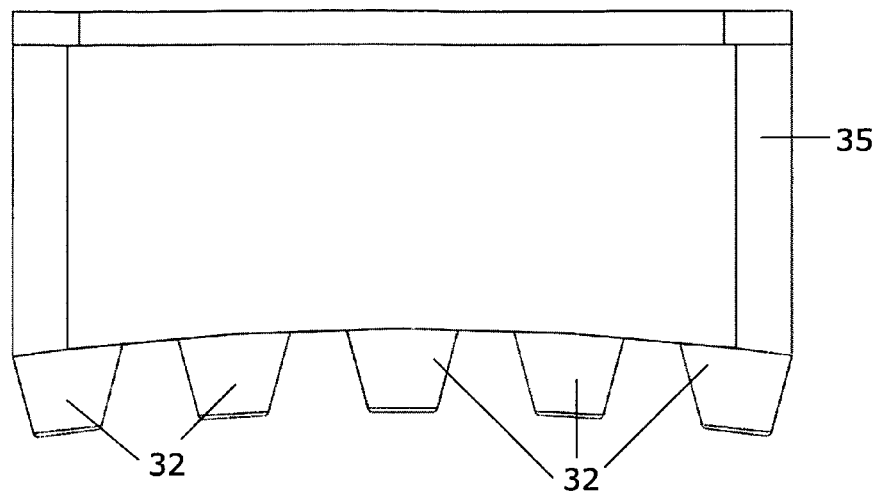
FIG. 12 shows in side view the heating jaw of the pinch applicator.

In FIG. 12 is shown in detail the heating jaw 35 of the pinch applicator 30 being provided with heating projections 32. These projections 32 have such dimensions that they may be inserted into the upper openings 14 of the application clamp 10.

Figure 13:
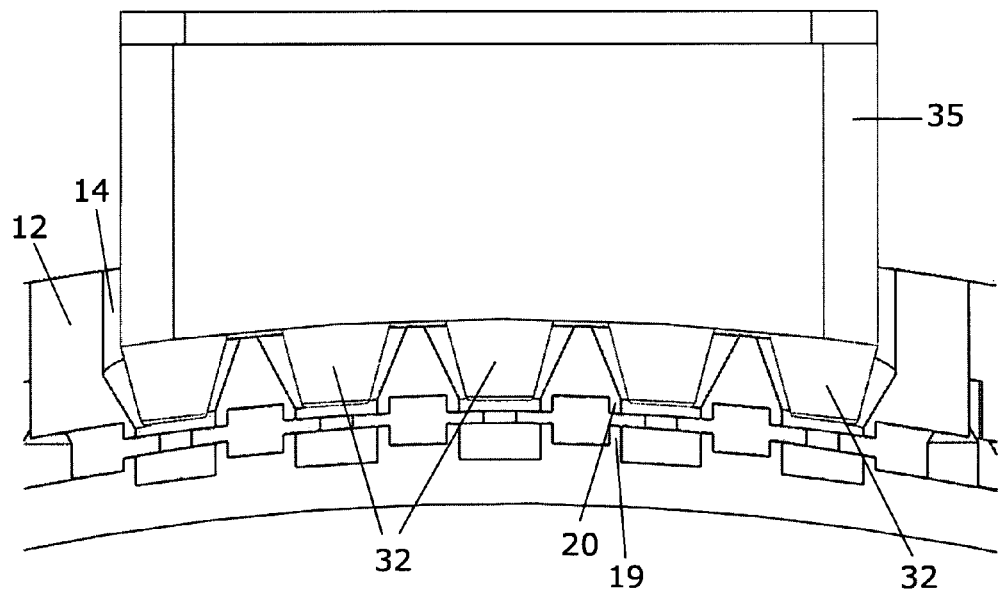
FIG. 13 shows in side view the application clamp with inserted heating jaw.

In FIG. 13 is shown how the heating projections 32 are inserted into the upper openings 14 of the upper arm 12 in order to make a heat conducting contact with the connection elements 4 of the hair extensions 2.

Figure 14:
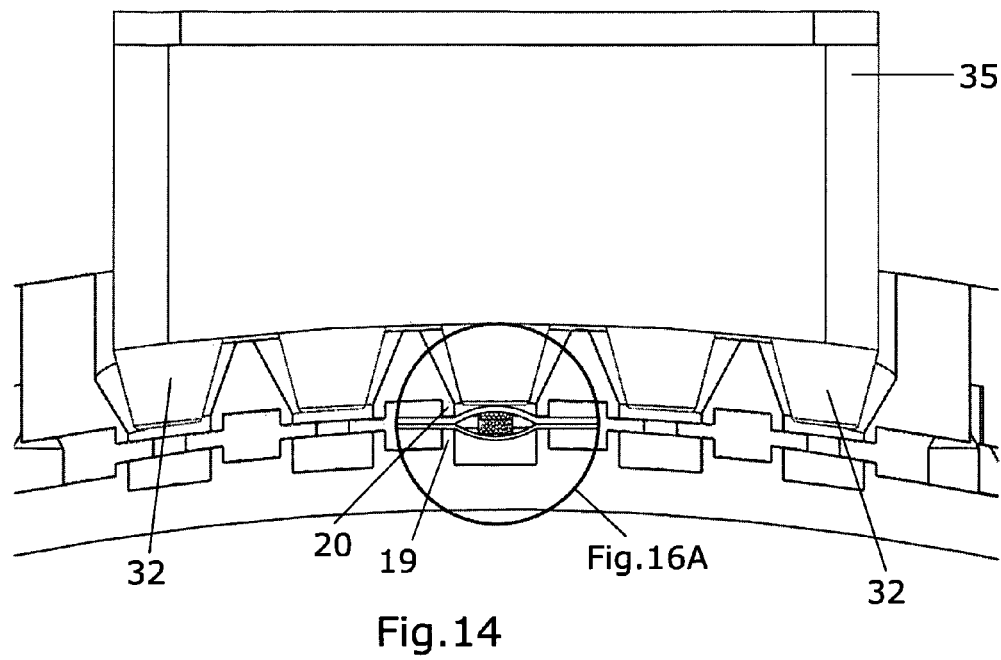
FIG. 14 shows in side view in detail the connection step in the melting chamber of the application clamp.

In FIG. 14 is shown in a cross-sectional view in detail how the melting chamber is formed by clamping together the upper edge 20 and the lower edge 19 of the application clamp 10 in order to press together the cover foil and the carrier foil and thereby configuring a closed chamber around the connection element and the bunch of hair.

Figure 15:
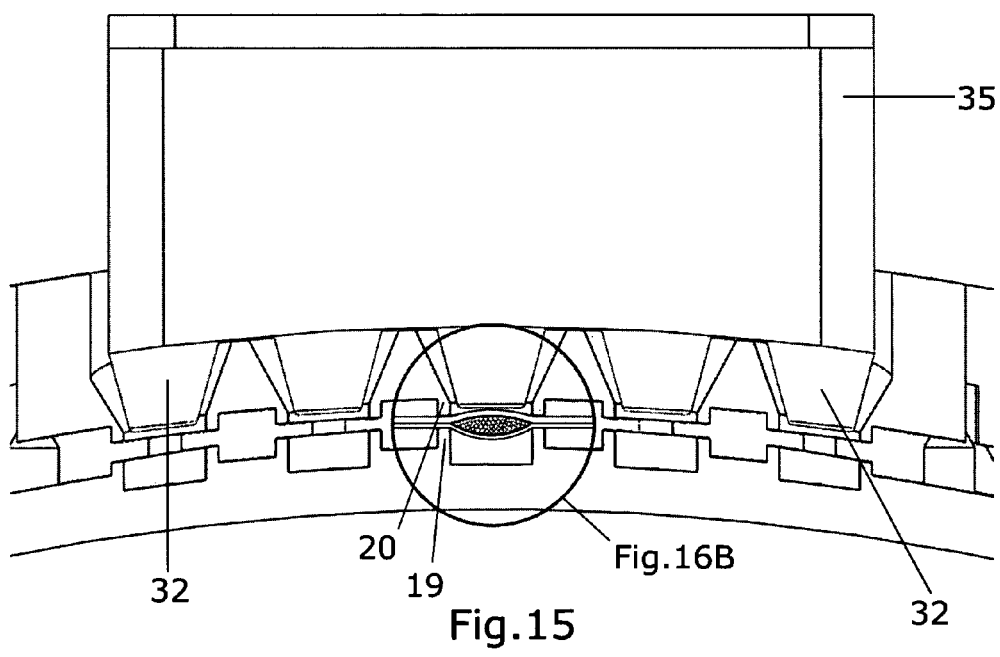
FIG. 15 shows in side view in detail the connection step of FIG. 14 after melting of the connection element.

In FIG. 15 is shown how the connection element is molten and a neat, regularly shaped connection element is formed in the melting chamber between the cover foil and the carrier foil.

Figures 16A, 16B:
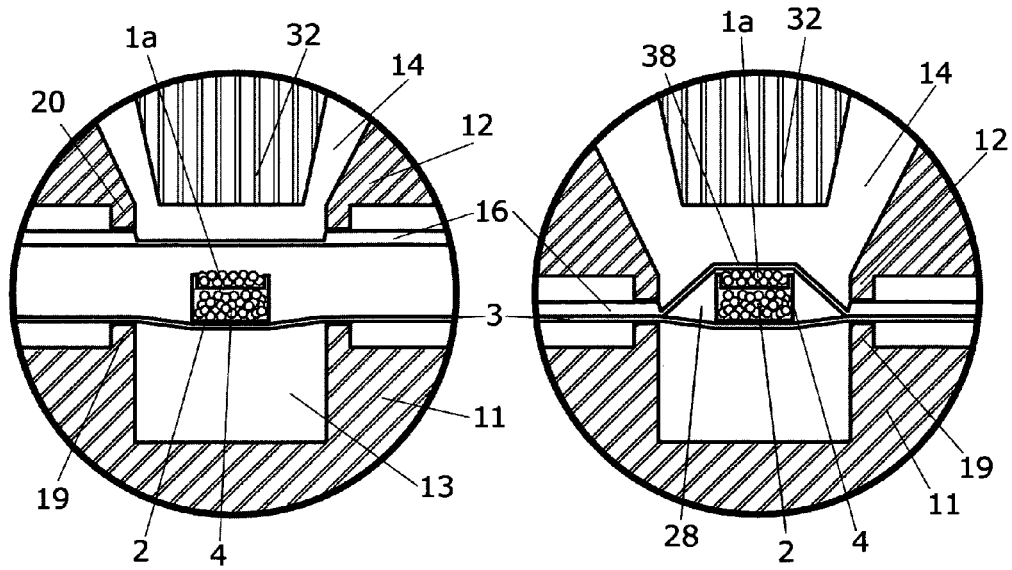
FIG. 16A-16F show in side view in detail the separate partial steps of the connection and melting process according to the invention.

In FIG. 16A is shown how the melting chamber 28 is configured between the clamped together lower arm 11 and upper arm 12 of the embodiment of the application clamp 10 of FIG. 4-6. The cover foil used is the embodiment of the cover foil 16 as shown in FIG. 10A-10B. The application clamp is still in the opened position.

In FIG. 16B the application clamp is closed and the melting chamber 28 is formed between the raised edges 19, 20 of respectively the lower recess 13 of the lower arm 11 and the upper opening 14 of the upper arm 12. Between the raised edges 19, 20 the carrier foil 3 and the cover foil 16 are fixedly clamped together, so that the molten connection element 4 cannot flow out, for example along the hairs. Thereby regularly shaped connections are obtained between the hair extensions 2 and the bunches basic hair 1a. The use of a cover foil 16 on the inside of the upper arm 12 has the advantage that the heating projections 32 will not stick to the connection elements 4 and that regularly shaped melted connections are obtained. On the bottom side is shown hair extension 2 with connection element 4 with on top (in cross-section) a bunch of basic hair 1a. As a result of the small thickness of the cover foil 16 at the location of the recess 38, this recess is more flexible and resilient than the carrier foil 3, so that the carrier foil 3 at the location of the connection element 4 is only slightly deformed and the cover foil 16 is strongly deformed and stretched out.

Figures 16C, 16D:
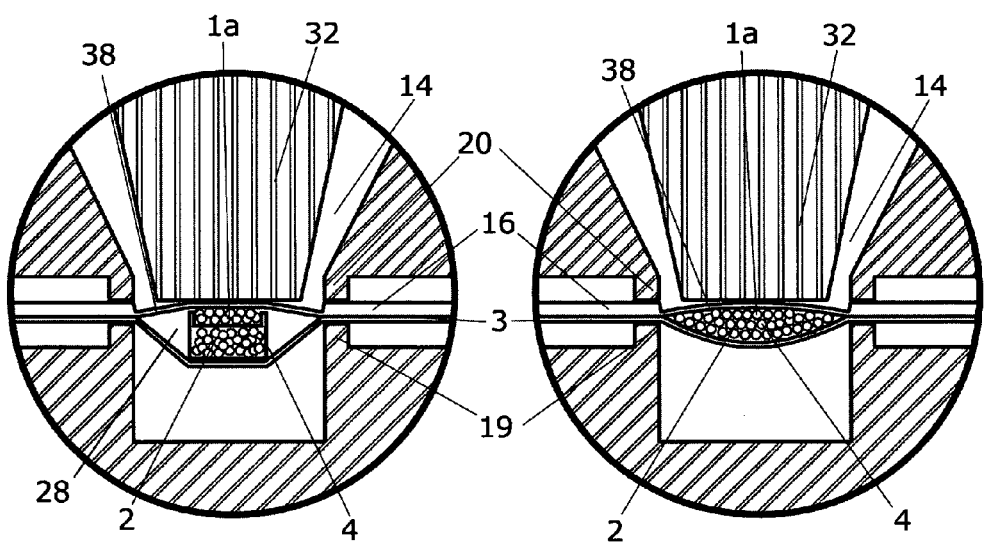

In FIG. 16C is shown how heating projection 32 is being brought into contact with the upper side of the cover foil 16. The heat conduction to the connection element 4 is improved as a result of the small thickness at the location of the recess 38 in the cover foil 16. The heating projection 32 presses the melting chamber downwards and thereby strongly deforms the carrier foil 3 at the expense of the cover foil 16.

In FIG. 16D is shown in an enlarged, magnified, portion of FIG. 14 the molten connection element 4 between the cover foil 16 and the carrier foil 3 after supplying heat to the connection element 4 of FIG. 16C. The molten connection element 4 is completely integrated between the hairs of the hair extension and the basic hair. As a result of the applied clamping force the molten element 4 has not flown out outside the raised edges 19, 20. The molten element has flowed through the entire chamber; as a result of which de chamber adopts and shapes into its most compact shape. Preferably the cover foil 16 is manufactured from rubber, like silicone rubber, thereby preventing sticking together with the connection element 4 and also removing the danger of melting of the cover foil by excessive heating. Preferably a hotmelt or another equivalent heat melting adhesive is chosen for the connection element 4, so that firstly the hair extensions may be fixed onto the carrier foil 3 and subsequently this fixed portions of hotmelt may be melted so that they will constitute a firm connection between the hair extensions and the basic hair.

Figures 16E, 16F:
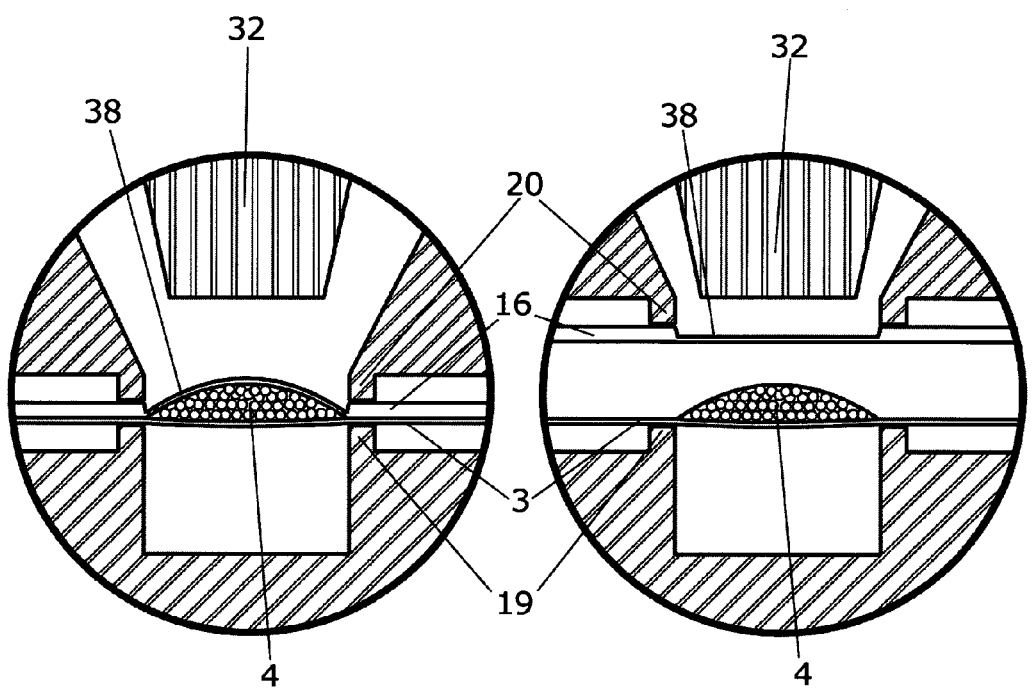

In FIG. 16E is shown how heating projection 32 is removed and how as a result of his greater elasticity the carrier foil 3 is almost horizontally flat. The entire mass of the molten element 4 flows upwards because the cover foil is less elastic or stiff. By this process the mixing and adhering of the hairs with the connection element 4 is optimal. By the springy bouncing movement of the foils 3, 16 the solidifying connection element 4 is 'fluxing' or flowing through the hair extension and the bunch of basic hair 1a.

In FIG. 16F is shown how the application clamp is opened and the cover foil 16 is removed from the solidified connection element 4. The formed connection element 4 has a regular shape and is provided with a smooth, convex, shape.

Above mentioned method may be performed with the application clamp 10 of the embodiment as shown in FIG. 8A-8B and with the embodiment of the cover foil 16 as shown in FIG. 10A-10B. The carrier foil 3 now essentially lies flatly upon the upper surface of the lower arm 11, because the lower recesses 13 of the lower arm 11 with raised edges 19 are not provided like in FIG. 16A-16B. Cover foil 16 is provided with recesses 38 at the side of the raised edges 20 of the upper openings 14, so that the thickness of the cover foil 16 inside the melting chamber 28 is less than outside the melting chamber. See also FIG. 10A-10B. At the location of the raised edges 20 the cover foil is indeed thick, so that the clamping and closing forces are increased.

Figure 20A:
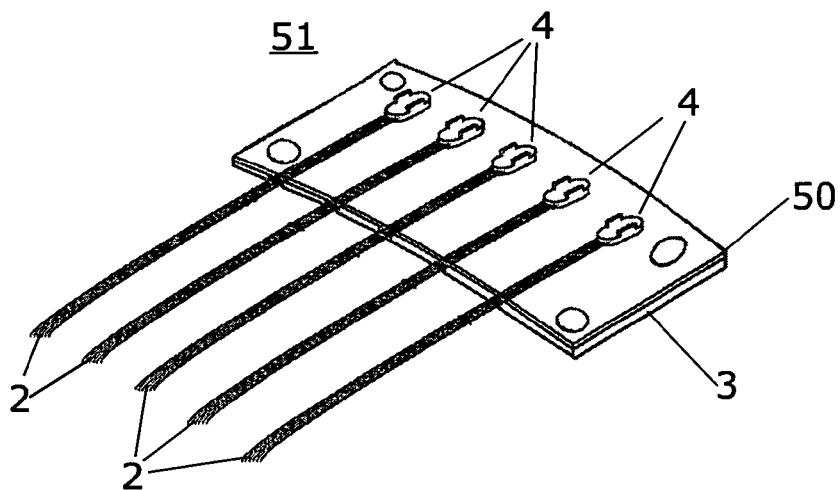
FIG. 20A shows in perspective view a hair extension assembly having a coated carrier foil and five hair extensions.

The carrier foil assembly 51 (also hair extension assembly) as for example shown in FIG. 6 and FIG. 20A comprises in an advantageous embodiment a carrier foil 3 of a flexible and elastic plastic, like polyester. When the flexibility of this carrier foil 3 is less than the cover foil 16 the connection elements 4, in the clamped position in the application clamp 10, will elongate or pull up the cover foil 16 upwards in the direction of the upper openings 14. This has the advantage that due to the upwards exerted (elastic) force of the flexible carrier foil 3 during the heating and the subsequent cooling, the molten connection elements 4 will be able to 'flux' or flow around through the hairs of the hair extension 2 and the bunches of basic hair 1a, so that the connection element 4 is well distributed over the hair extension and the bunch of basic hair 1a, resulting in the formation of a strong and regularly shaped connection element after solidification.

In order to obtain an easy to use and to apply carrier foil assembly 51, the carrier foil 3 preferably is not provided with an binder or adhesive layer. When a binder or adhesive layer is present upon the carrier foil 3 during attachment of the hair extensions 2, the basic hairs 1a will stick or adhere onto the carrier foil 3, so that a, often painful, pulling off of the basic hairs from the carrier foil 3 will be necessary. In order to make the attachment and adhering of the connection elements 4 possible and/or to facilitate it upon a smooth plastic like polyester foil, the connection elements 4 are preferably attached by means of a heat releasable or soluble (heat or thermally releasable) release coating like a curing glue.

Figure 20B:
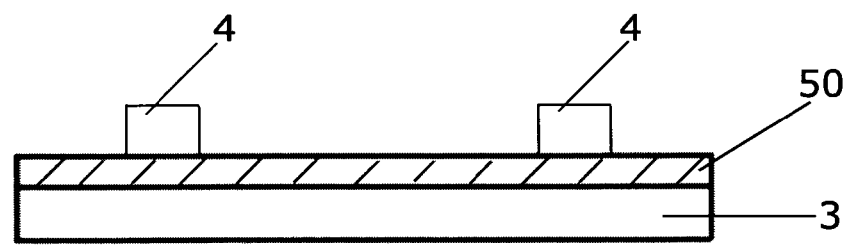
FIG. 20B shows in cross-sectional view the coated carrier foil, provided with hair extension connection elements.

In an advantageous embodiment as shown in FIG. 20A and in cross-section in FIG. 20B the carrier foil 3 is provided, on its upper side where the hair extensions 2 are attached, with a layer of a heat releasable or soluble coating 50, whereby firstly the binding of the connection elements 4 upon the smooth surface of the plastic foil 3 is improved. Secondly when heated the release coating 50 loses its binding properties, both with the carrier foil 3 and with the connection elements 4, so that as a result the molten connection elements 4 will not or scarcely stick onto the carrier foil 3, so that the hair extensions 2, after attachment into the basic hair, are easily removed from the carrier foil 3. The heat releasable coating 50 must preferably lose its binding properties above a temperature of 100-200° C. and must be thermally stable at lower temperatures so that after manufacturing the connection elements 4 will remain fixedly connected onto the carrier foil 3 for example during transport or other operations.

The release coating 50 may be applied as a single layer, as shown in FIG. 20B, but may also be constituted from or applied in several layers, whereby the composition of the separate layers may be identical or may deviate from each other in order to obtain a complex layer having improved releasing and/or binding properties.

A suitable material for the heat releasable coating is A24562 from Hoechst or Revalpha of Nitto Denko.

Figure 17A:
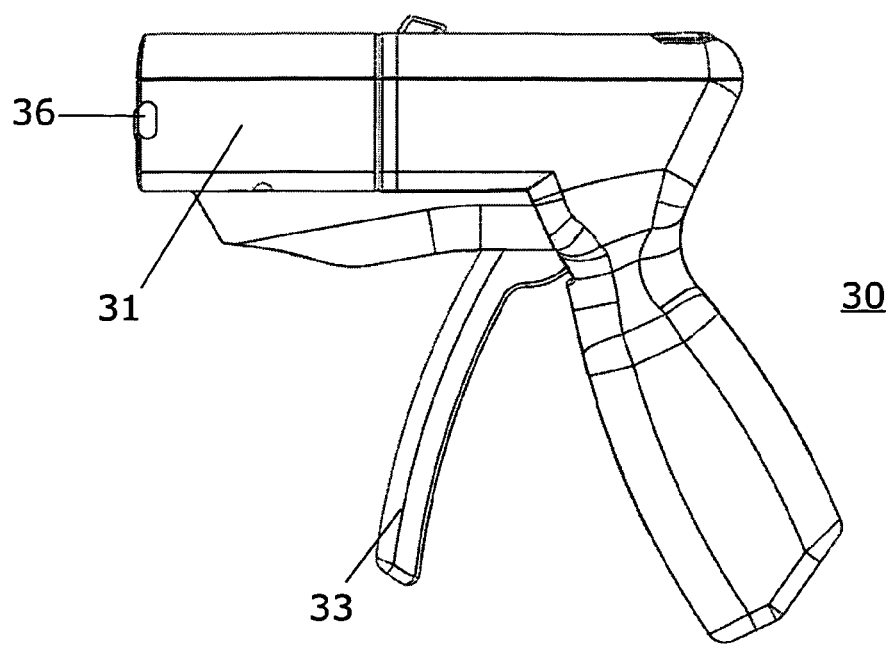
FIG. 17A shows in side view the pinch applicator according to the invention.

In FIG. 17A is shown pinch applicator 30 for use with the method according to the invention. The pinch applicator 30 comprises among others a housing 31, an actuation handle 33, and coupling means 36 for coupling with the coupling means 26 of the applicator clamp 10.

Figure 17B:
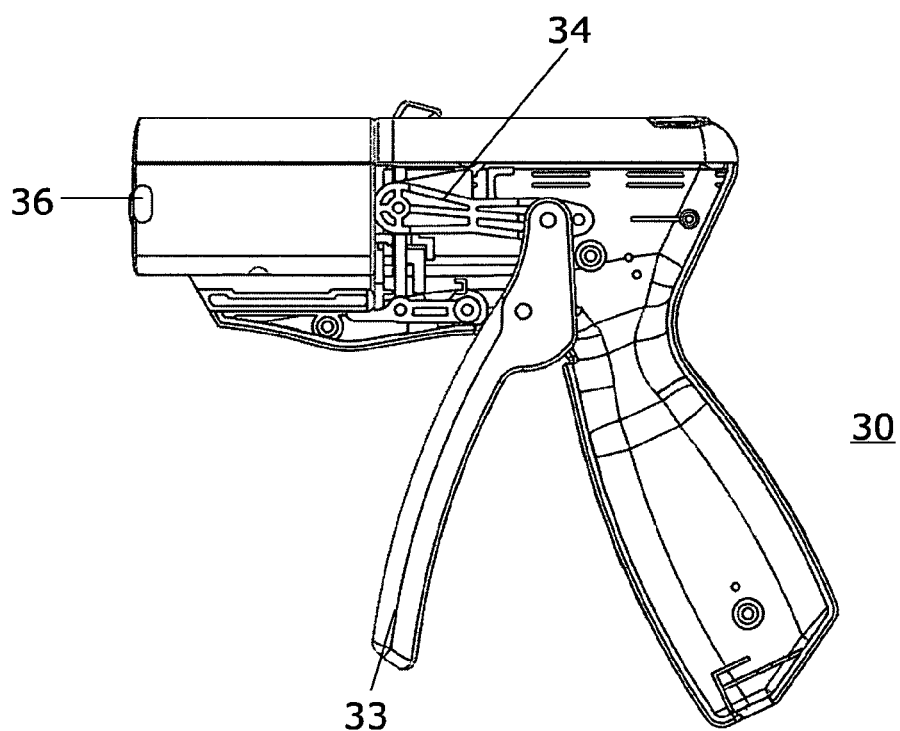
FIG. 17B shows in cross-sectional view the pinch applicator of FIG. 17A.

In FIG. 17B shows in cross-section the application clamp 10 having an heating jaw 35 (not visible) and a mechanism 34 mounted between the actuating handle 33 and the heating jaw 35 for sliding thereof into the upper openings of the application clamp 10.

Figure 18:
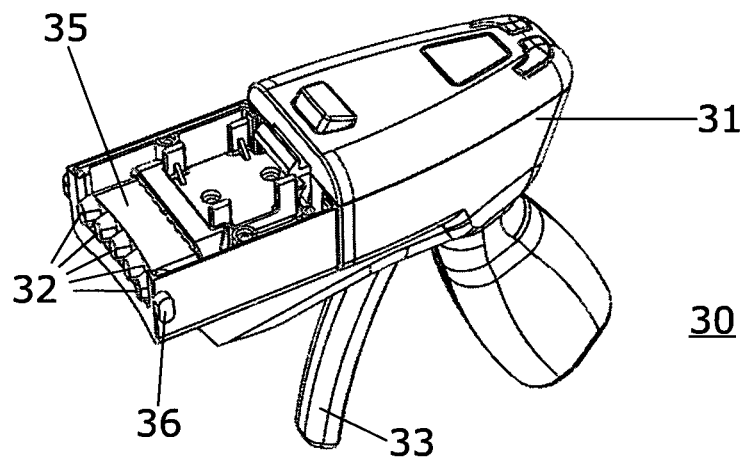
FIG. 18 shows in perspective top view the pinch applicator.

In FIG. 18 is shown in top view, having the top part of the housing removed, the heating jaw 35 with heating projections 32.

Figure 19:
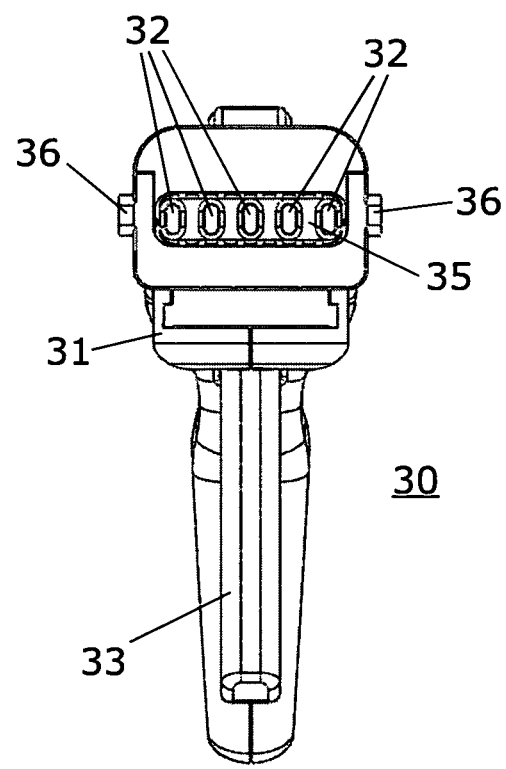
FIG. 19 shows in front view the pinch applicator.

In FIG. 19 in front view of the pinch applicator 30 is shown the heating jaw 35 with—in this embodiment—five heating projections 32 for a corresponding application clamp 10 having five upper openings 14.

Other equivalent, obvious for the man skilled in the art, measures for attaching hair extensions by means of a pinch applicator and an application clamp are considered to be included in the scope of the invention here described.

The invention claimed is:

1. An application clamp for attaching hair extensions into basic hair, the clamp comprising:
    a lower arm adapted to mount a carrier foil with hair extensions, said lower arm provided with lower recesses adapted to receive connection elements that connect the hair extensions to the carrier foil;
    an upper arm comprising a plurality of upper openings extending through the upper arm from an upper side of the upper arm to an inner side of the upper arm, wherein said plurality of the upper openings is configured to receive a heater and is configured to conform to heating projections of the heater, wherein in a closed position, the plurality of the upper openings and lower recesses closely fit to constitute melting chambers;
    a clamp hinge interconnecting the lower arm and the upper arm; and
    clamping elements for clamping together both arms when in the closed position.

2. The application clamp according to claim 1, wherein the lower arm is provided with upper comb elements and lower comb elements, wherein said upper and lower comb elements are essentially oppositely arranged, so that bunches of basic hair are positioned between the upper and lower comb elements onto the hair extensions.

3. The application clamp according to claim 1, wherein the upper arm and the lower arm have an arcuate shape or a concave shape.

4. The application clamp according to claim 1, wherein the lower recesses and/or the plurality of the upper openings on their inside are provided with raised edges.

5. The application clamp according to claim 1, wherein the upper arm on its inside is provided with a cover foil of flexible material.

6. The application clamp according to claim 5, wherein the cover foil is made of rubber.

7. The application clamp according to claim 5, wherein the cover foil is provided with recesses—or foil portions having a reduced thickness—at the position of the plurality of the upper openings of the upper arm.

8. The application clamp according to claim 5, wherein the cover foil is made of silicone rubber.

9. The application clamp according to claim 1, wherein clamping elements with interlocking is provided for clamping together the lower arm and the upper arm.

10. The application clamp according to claim 1, wherein the application claim further comprises a connector on the outside of the upper arm when in the closed position, said connector adapted to connect a heater to the upper arm such that said heater provides heat to the melting chambers.

11. The application clamp according to claim 1 wherein the application clamp is adapted to receive heating protections of a heating jaw so as to provide heat from a heater to the connection elements within the melting chamber.

12. A method for attaching hair extensions into basic hair comprising:
    providing a carrier foil with a number of hair extensions whereby the hair extensions are fixed onto the carrier foil by connection elements,
    positioning the carrier foil with hair extensions into the lower arm having lower recesses of the application clamp according to claim 1 such that the connection elements are positioned at a location of the lower recesses,
    securing the application clamp into the basic hair and subsequently arranging bunches of basic hair over the hair extensions,
    closing the application clamp by clamping together the—hingingly interconnected—upper arm and lower arm in such a way that a upper recesses are positioned upon the connection elements,
    wherein the method further comprises:
    coupling a pinch applicator onto the application clamp,
    heating the connection elements by moving heating projections of the pinch applicator into upper openings of the application clamp and pressing the heating projections onto the connection elements,
    disconnecting the pinch applicator,
    removing the application clamp from the basic hair by opening the upper arm of the application clamp and removing the carrier foil from the lower arm.

13. The method for attaching hair extensions according to claim 12, comprising:
    removing the hair extensions from the carrier foil by pulling off the connection elements from the carrier foil.

14. The method for attaching hair extensions according to claim 12, wherein an inner side of the upper arm of the applicator clamp is provided with a cover foil of flexible material.

15. The method for attaching hair extensions according to claim 14 wherein the cover foil is made of rubber.

16. The method for attaching hair extensions according to claim 14 wherein the cover foil is made of silicone rubber.

17. A kit comprising the application clamp according to claim 1 and a pinch applicator for attaching hair extensions into basic hair, said pinch applicator comprising: a housing; an actuating arm; a heating jaw, and a mechanism, connected with the actuating arm, for sliding out the heating jaw; wherein the heating jaw is provided with heating projections corresponding to the plurality of the upper openings of the application clamp.

18. The kit according to claim 17, wherein coupling elements are provided which are arranged to cooperate with the coupling elements of the application clamp to allow for coupling the pinch applicator and the clamp.

19. A kit comprising the application clamp according to claim 1 and a hair extension assembly for attaching hair extensions into basic hair, said hair extension assembly comprising: a carrier foil; hair extensions consisting of bundles hair; connection elements fixing the hair extensions onto the carrier foil and configured to connect the hair extensions to the basic hair after attachment in the basic hair.

20. The kit according to claim 19, wherein the connection elements are portions hot melt adhesive.

21. The kit according to claim 19, wherein the carrier foil is made of plastic, and the flexibility of the plastic carrier foil is lower than the flexibility of a cover foil of an application clamp.

22. The kit according to claim 19, whereby a release coating is provided between the connection elements and the carrier foil.

23. The kit according to claim 19, wherein the carrier foil is made of polyester.

24. The kit according to claim 22, wherein the release coating loses its binding power above 100° C.-200° C.

25. The kit according to claim 22, wherein the release coating essentially is provided upon an entire upper side of the carrier foil.

26. The kit according to claim 25, wherein the release coating upon the carrier foil—particularly in the use position in the application clamp—comprises no or little adhesive capacity, so that the basic hairs will not adhere onto the release coating or will be easily releasable from this coating.

27. An application clamp for attaching hair extensions into basic hair, the clamp comprising:

a lower arm adapted to receive a carrier foil with hair extensions, said lower arm provided with lower recesses adapted to receive connection elements that connect the hair extensions to the carrier foil;

an upper arm provided with upper openings wherein in a closed position, the upper openings and lower recesses closely fit to constitute melting chambers;

a clamp hinge interconnecting the lower arm and the upper arm;

clamping elements for clamping together both arms when in the closed position, wherein the clamping elements are interlocking for clamping together the lower arm and the upper arm, wherein the clamping elements comprise:

an eccentric handle;

a handle arm, connected to the eccentric handle by a first handle hinge; and a second handle hinge for connecting the handle arm with the lower arm.

28. The application clamp according to claim 27, wherein the lower arm longitudinally is provided with a support element.

29. The application clamp according to claim 28, wherein the support element comprises metal.

30. The application clamp according to claim 28, wherein the support element comprises the second handle hinge and/or the clamp hinge.

* * * * *

UNITED STATES PATENT AND TRADEMARK OFFICE
CERTIFICATE OF CORRECTION

| | |
|---|---|
| PATENT NO. | : 8,844,541 B2 |
| APPLICATION NO. | : 12/935571 |
| DATED | : September 30, 2014 |
| INVENTOR(S) | : Richard Guliker |

Page 1 of 1

It is certified that error appears in the above-identified patent and that said Letters Patent is hereby corrected as shown below:

In the Claims

In column 10 at line 14, In Claim 11, change "protections" to --projections--.

Signed and Sealed this
Thirtieth Day of June, 2015

Michelle K. Lee
*Director of the United States Patent and Trademark Office*